(12) United States Patent
     Khlat

(10) Patent No.: US 8,892,057 B2
(45) Date of Patent: Nov. 18, 2014

(54) CARRIER AGGREGATION RADIO SYSTEM

(75) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 26 days.

(21) Appl. No.: 13/569,219

(22) Filed: Aug. 8, 2012

(65) Prior Publication Data

US 2013/0051284 A1 Feb. 28, 2013

Related U.S. Application Data

(60) Provisional application No. 61/526,423, filed on Aug. 23, 2011.

(51) Int. Cl.
| | |
|---|---|
| H04B 1/44 | (2006.01) |
| H04B 1/38 | (2006.01) |
| H04M 1/00 | (2006.01) |
| H04B 17/02 | (2006.01) |
| H04B 1/04 | (2006.01) |
| H04B 7/00 | (2006.01) |
| H04B 7/005 | (2006.01) |
| H04W 4/00 | (2009.01) |
| H04B 7/10 | (2006.01) |
| H04L 5/00 | (2006.01) |
| H04L 5/06 | (2006.01) |

(52) U.S. Cl.
CPC .. *H04L 5/00* (2013.01); *H04L 5/06* (2013.01); *H04L 5/001* (2013.01)
USPC ............. 455/78; 370/277; 370/278; 370/310; 370/328; 370/334; 455/83; 455/107; 455/137; 455/73; 455/562.1; 375/347

(58) Field of Classification Search
CPC ... H04W 72/00; H04W 72/04; H04W 72/042; H04W 72/0406; H04W 36/06; H04W 16/14; H04W 24/02; H04L 5/001; H04B 7/024

USPC ................ 370/276–297, 328, 329, 310, 334; 455/73, 553.1, 450, 575.7, 562.1, 78, 455/69, 83, 91, 107, 126, 137, 550.1; 375/219, 316, 347

See application file for complete search history.

(56) References Cited

U.S. PATENT DOCUMENTS

| | | | | |
|---|---|---|---|---|
| 7,116,952 | B2 * | 10/2006 | Arafa ............................. | 455/132 |
| 2005/0227631 | A1 * | 10/2005 | Robinett ........................ | 455/83 |
| 2005/0245202 | A1 * | 11/2005 | Ranta et al. ..................... | 455/78 |
| 2006/0121937 | A1 * | 6/2006 | Son ............................ | 455/553.1 |
| 2006/0221894 | A1 * | 10/2006 | Casaccia et al. .............. | 370/328 |
| 2008/0300021 | A1 * | 12/2008 | Knudsen et al. ........... | 455/562.1 |
| 2009/0285135 | A1 * | 11/2009 | Rousu et al. .................. | 370/297 |
| 2010/0091688 | A1 * | 4/2010 | Staszewski et al. ........... | 370/277 |
| 2010/0210272 | A1 * | 8/2010 | Sundstrom et al. ........... | 455/450 |

* cited by examiner

*Primary Examiner* — Benjamin H Elliott, IV
*Assistant Examiner* — Eric Nowlin
(74) *Attorney, Agent, or Firm* — Withrow & Terranova, P.L.L.C.

(57) ABSTRACT

A carrier aggregation radio system is provided. The carrier aggregation radio system includes a transceiver having a main receiver, a diversity receiver and a carrier aggregation receiver. The carrier aggregation radio system further includes a control system adapted to command a radio front end to route diversity signals from a diversity antenna to the main and diversity receivers in a first mode and to command the radio front end to route carrier aggregation signals from the diversity antenna to the carrier aggregation receiver in a second mode. The control system may also command a third mode in which diversity signals are routed to the main and diversity receivers while carrier aggregation signals are routed to the carrier aggregation receiver.

18 Claims, 13 Drawing Sheets

US 8,892,057 B2

CARRIER AGGREGATION RADIO SYSTEM

RELATED APPLICATIONS

This application claims the benefit of provisional patent application Ser. No. 61/526,423, filed Aug. 23, 2011, the disclosure of which is hereby incorporated herein by reference in its entirety.

FIELD OF THE DISCLOSURE

Embodiments of the present disclosure relate to radio communication and in particular to transmission and reception of RF signals in different bands simultaneously.

BACKGROUND

Demands for cellular downlink data are rapidly increasing as consumers use greater numbers of data intensive applications on their wireless data devices. This trend is encouraging wireless carriers and wireless service providers to explore new ways of increasing downlink data rates. One known method for increasing downlink data rates employs carrier aggregation. Carrier aggregation allows a wireless device to simultaneously receive data using multiple downlink frequency bands to improve throughput while simultaneously transmitting on another band. However, typical architectures for carrier aggregation add extra diplexing networks that degrade transceiver performance due to insertion losses. What is needed is a carrier aggregation radio system that maintains a simple radio front end architecture that does not need extra diplexing networks, thereby avoiding transceiver performance degradation due to insertion losses.

SUMMARY

The present disclosure provides a carrier aggregation radio system that maintains a simple radio front end architecture that does not need extra diplexing networks, thereby avoiding transceiver performance degradation due to insertion losses. The carrier aggregation radio system includes having a main receiver, a diversity receiver, and a carrier aggregation receiver. The carrier aggregation radio system further includes a control system adapted to command a radio front end to route diversity signals from a diversity antenna to the main receiver and the diversity receiver in a first mode and to command the radio front end to route carrier aggregation signals from the diversity antenna to the carrier aggregation receiver in a second mode. In at least one embodiment, the control system is further adapted to also command a third mode in which diversity signals are routed from the diversity antenna to the main receiver and the diversity receiver while carrier aggregation signals are routed from the diversity antenna to the carrier aggregation receiver.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Wireless communication terminals typically include a diversity antenna to improve reception of RF signals in RF multi-path environments. Embodiments of the present disclosure repurpose the diversity antenna of a wireless communication terminal during carrier aggregation operation to avoid adding extra diplexing networks that degrade transceiver performance due to insertion losses. Throughout the drawings, reference designators RF1, RF2, and RF3 represent a first radio frequency (RF) signal, a second RF signal and a third RF signal, respectively.

Figure 1:
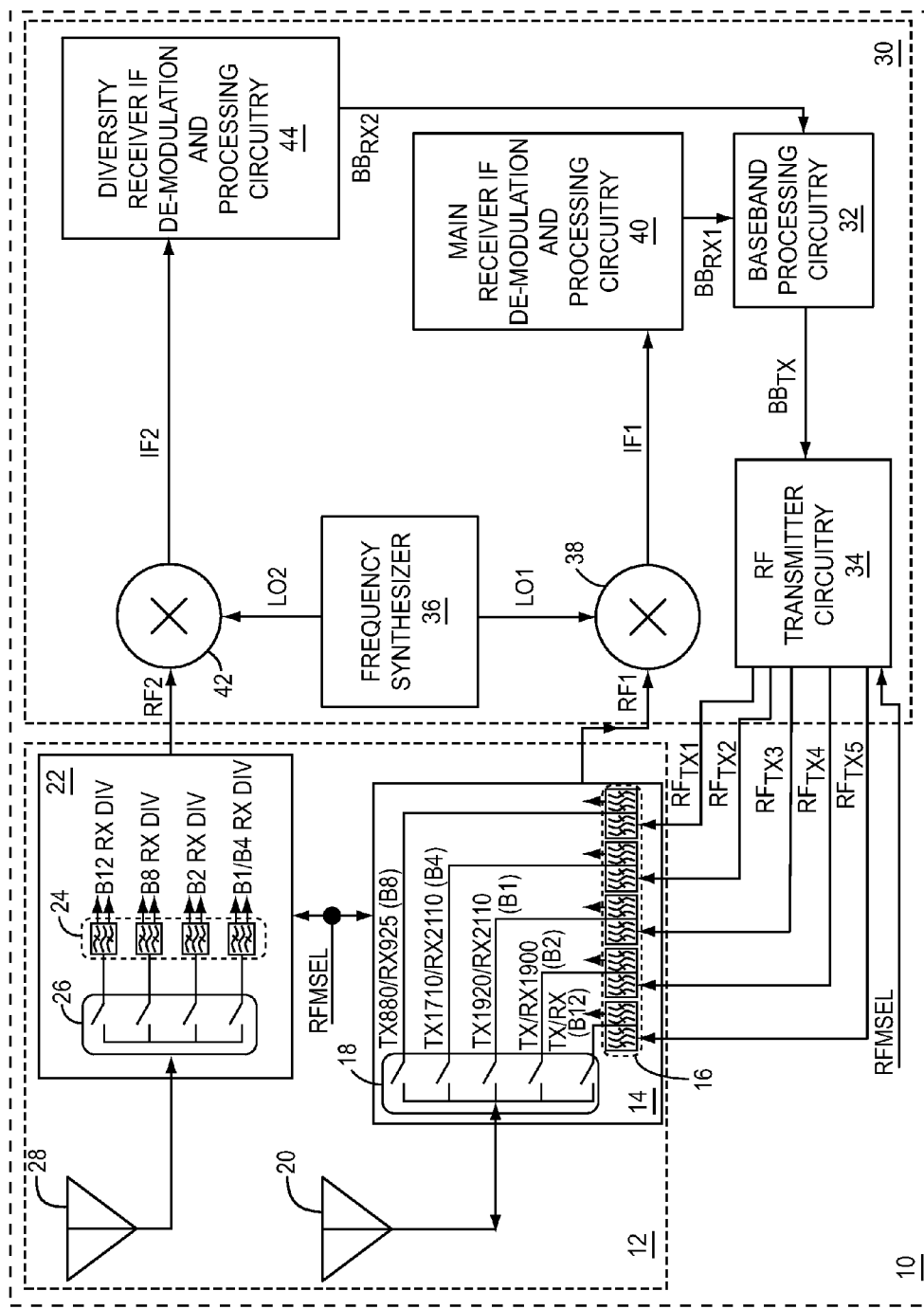
FIG. 1 is a schematic of a related art radio system with a multiband transceiver.

FIG. 1 is a schematic of a related art radio system 10 with a radio front end 12 configured to operate in a first mode that includes receiver diversity. The radio front end 12 includes main receiver front end circuitry 14 having duplexers 16 coupled to main antenna switches 18. A main antenna 20 is selectively coupled to selected ones of the duplexers 16 via the main antenna switches 18 in response to an RF mode selection signal RFMSEL. The radio front end 12 also includes diversity receiver front end circuitry 22 having receive only filters 24 coupled to diversity antenna switches 26. A diversity antenna 28 is selectively coupled to selected ones of the receive only filters 24 via the diversity antenna switches 26 in response to the RF mode selection signal RFMSEL.

A diversity transceiver 30 is interfaced to the radio front end 12. The diversity transceiver 30 includes baseband processing circuitry 32 that processes baseband data such as voice and text information. An RF transmitter circuitry 34 receives baseband transmit signals $BB_{TX}$ from the baseband processing circuitry 32. In response to the RF mode selection signal RFMSEL, the RF transmitter circuitry 34 generates RF transmit signals such as exemplary RF transmit signals $RF_{TX1}$ through $RF_{TX5}$ that are selectively routed through the duplexers 16 for transmission from the main antenna 20.

A frequency synthesizer 36 provides a first local oscillator signal LO1 to a first RF mixer 38 that receives RF signals captured by the main antenna 20 and selectively routed through the duplexers 16. A first IF signal IF1 is generated and output from the first RF mixer 38. The first IF signal IF1 carries information encoded in a selected one of the RF signals captured by the main antenna 20.

A main receiver intermediate frequency (IF) demodulation and processing circuitry 40 demodulates and processes a first IF signal IF1 generated by the first RF mixer 38. A first demodulated and processed baseband signal $BB_{RX1}$ is output from the main receiver IF demodulation and processing circuitry 40. The first demodulated and processed baseband signal $BB_{RX1}$ can then be further processed by the baseband processing circuitry 32 so that the information of the baseband signal $BB_{RX1}$ can be displayed and/or reproduced as sound via user interface circuitry (not shown).

A second RF mixer 42 receives RF signals captured by the diversity antenna 28 and selectively routed through the receive only filters 24. The second RF mixer 42 also receives a second local oscillator signal LO2 that is mixed with the captured RF signals to generate a second IF signal IF2 that contains information encoded in a selected one of the RF signals captured by the diversity antenna 28. A diversity receiver IF demodulation and processing circuitry 44 demodulates and processes the second IF signal IF2 generated by the first RF mixer 38. A second demodulated and processed baseband signal $BB_{RX2}$ is output from the diversity receiver IF demodulation and processing circuitry 44. The second demodulated and processed baseband signal $BB_{RX2}$ can then be further processed by the baseband processing circuitry 32 so that the information of the baseband signal $BB_{RX2}$ can be displayed and/or reproduced as sound via user interface circuitry (not shown).

Figure 2:
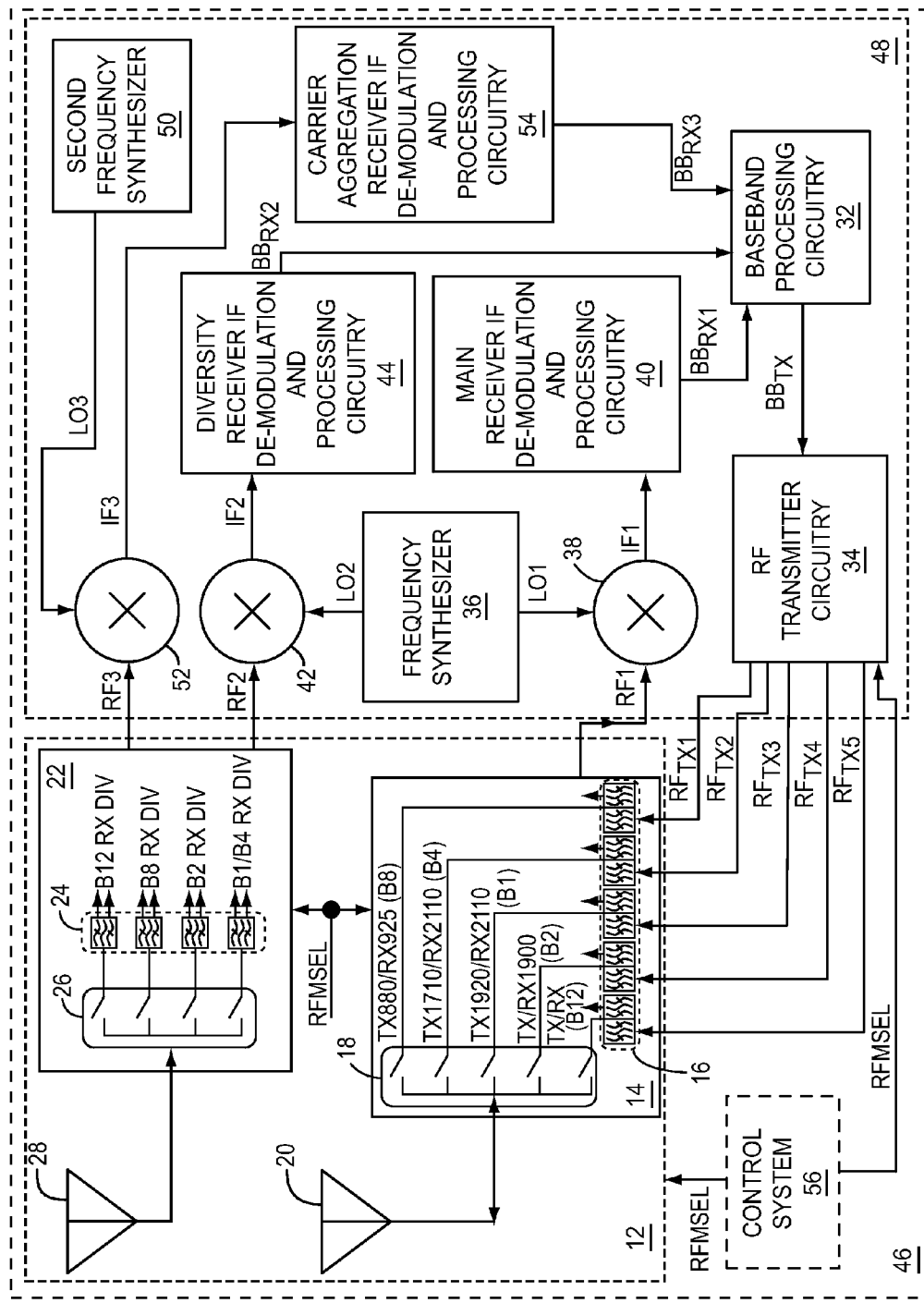
FIG. 2 is a schematic of a carrier aggregation radio system that in accordance with the present disclosure includes a second mode that transmits and receives RF signals within one band while receiving an RF signal in another band.

FIG. 2 is a schematic of a carrier aggregation radio system 46 that in accordance with the present disclosure includes a second mode that transmits and receives RF signals within one band while receiving an RF signal in another band. In order to provide operation in this second mode, a carrier aggregation transceiver 48 includes a second frequency synthesizer 50, a third RF mixer 52, carrier aggregation receiver IF demodulation and processing circuitry 54, and a control system 56. The third RF mixer 52 receives RF signals captured by the diversity antenna 28, wherein the RF signals are selectively routed through the receive only filters 24 in response to the RF mode selection signal RFMSEL. It is to be understood that the diversity antenna 28 is repurposed in the second mode to serve as a second antenna dedicated to receive an extra carrier aggregation receive band to avoid a need to add a diplexer network on the main antenna 20.

During the second mode of operation, the third RF mixer 52 also receives a third local oscillator signal LO3 that is mixed with the captured RF signals to generate a third IF signal IF3 that contains information encoded in a selected one of the extra carrier aggregation receive band's RF signals captured by the diversity antenna 28. The carrier aggregation receiver IF demodulation and processing circuitry 54 demodulates and processes the third IF signal IF3 generated by the third RF mixer 52. A third demodulated and processed baseband signal $BB_{RX3}$ is output from the carrier aggregation receiver IF demodulation and processing circuitry 54. The third demodulated and processed baseband signal $BB_{RX3}$ can then be further processed by the baseband processing circuitry 32 so that the information of the baseband signal $BB_{RX3}$ can be displayed and/or reproduced as sound via user interface circuitry (not shown) that typically includes a display screen, a speaker, microphone and keypad.

In addition to generating data for the RF mode selection signal RFMSEL needed for the second mode, the control system 56 is also programmed to generate data for the RF mode selection signal RFMSEL such that the carrier aggregation radio system 46 includes the first mode that provides diversity reception like the related art radio system 10 (FIG. 1). In particular, the control system 56 generates data for the RF mode selection signal RFMSEL in order to select appropriate ones of the exemplary RF transmit signals $RF_{TX1}$ through $RF_{TX5}$, while also generating data for the RF mode selection signal RFMSEL to control the main antenna switches 18 and the diversity antenna switches 26 for either the first mode or the second mode. It is to be understood that the RF mode selection signal RFMSEL can be a serial digital signal or a parallel digital signal made up of typical data communications protocols. Note that the radio front end 12 incorporated in the carrier aggregation radio system 46 is unchanged from the related art radio system 10. Thus, the simplicity, relatively low cost, and relatively low insertion loss of the radio front end 12 is retained for the embodiments of the present disclosure. Moreover, no additional switch throws are needed to implement embodiments of the present disclosure, thus a simple switch configuration is maintained.

Figure 3:
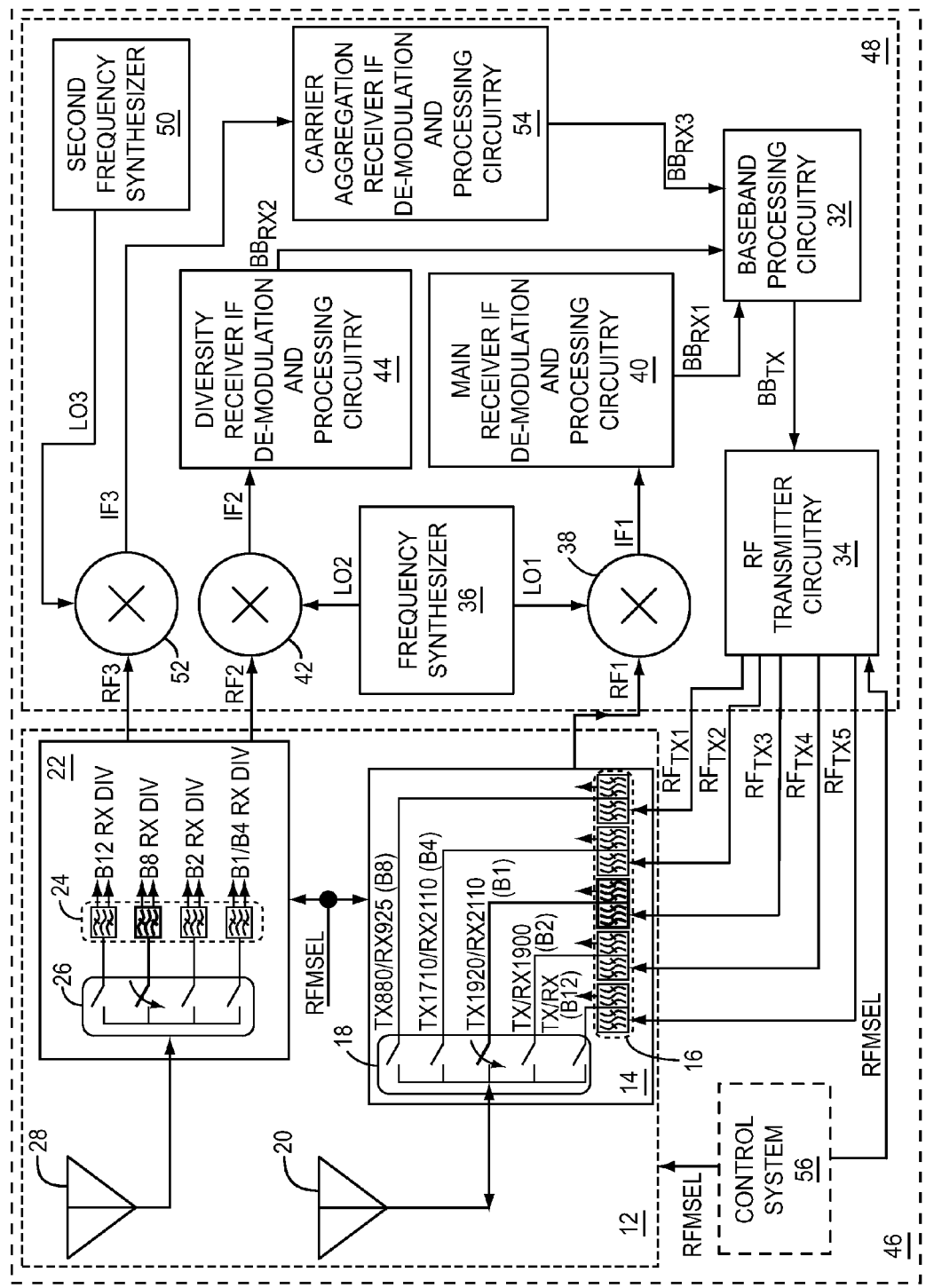
FIG. 3 is a schematic of the carrier aggregation radio system operating in the second mode for carrier aggregation that transmits and receives RF signals within a band B1 while receiving an RF signal in another band B8.

FIG. 3 is a schematic of the carrier aggregation radio system 46 operating in the second mode for carrier aggregation in a first example. In this case, the band B1 duplexer of the duplexers 16 is active and the band B8 RX filter of the receive only filters 24 is active. In this first example, low band to high band carrier aggregation is achieved by transmitting and receiving RF signals in band B1, while receiving other RF signals in band B8.

Figure 4:
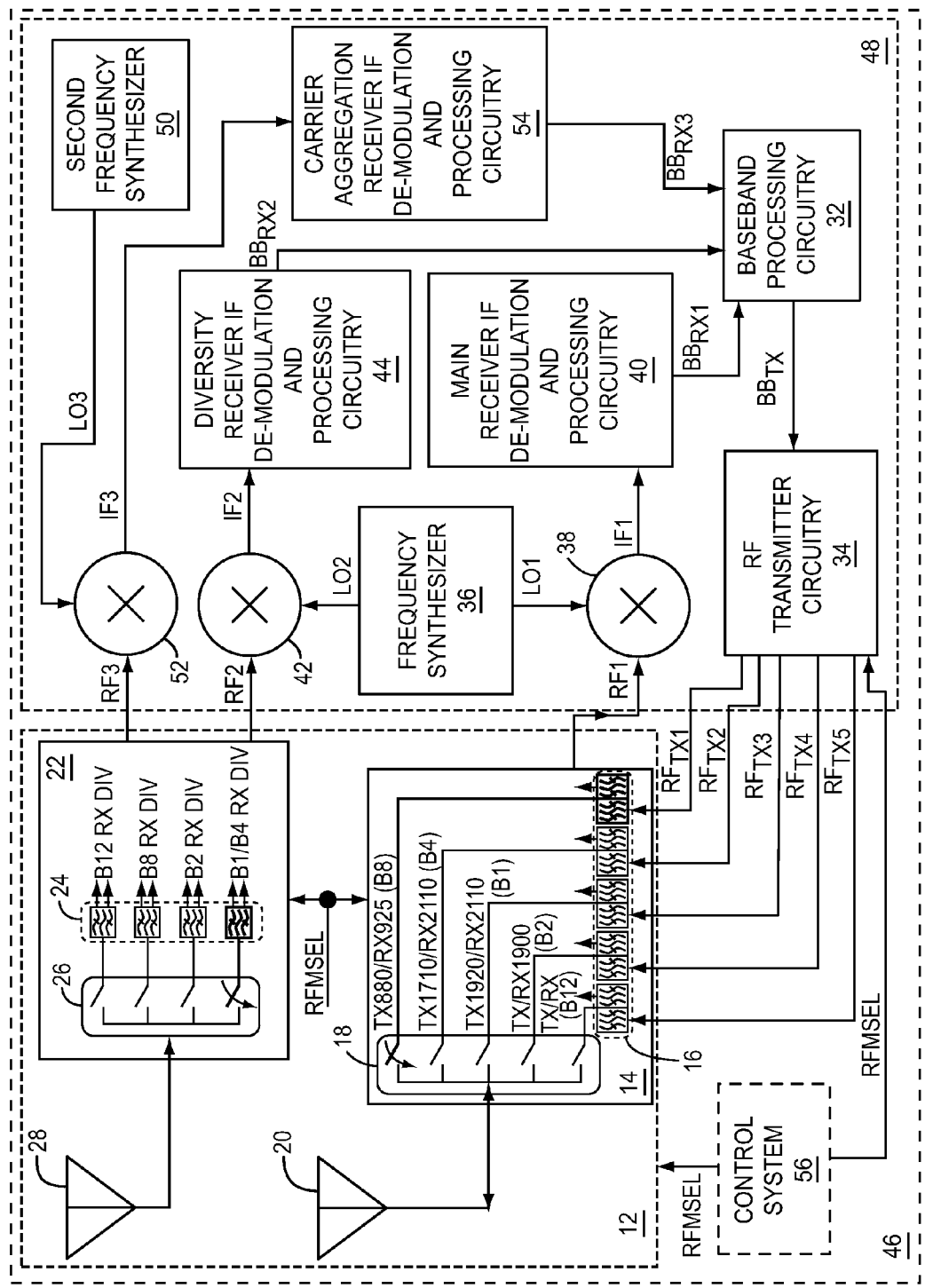
FIG. 4 is a schematic of the carrier aggregation radio system operating in the second mode for carrier aggregation that transmits and receives RF signals within a band B8 while receiving an RF signal in another band B1.

FIG. 4 is a schematic of the carrier aggregation radio system 46 operating in the second mode for carrier aggregation in a second example. In this second case, the band B8 duplexer of the duplexers 16 is active and the band B1/B4 RX filter of the receive only filters 24 is active. In this second example, low band to high band carrier aggregation is achieved by transmitting and receiving RF signals in band B8, while receiving other RF signals in band B1.

Figure 5:
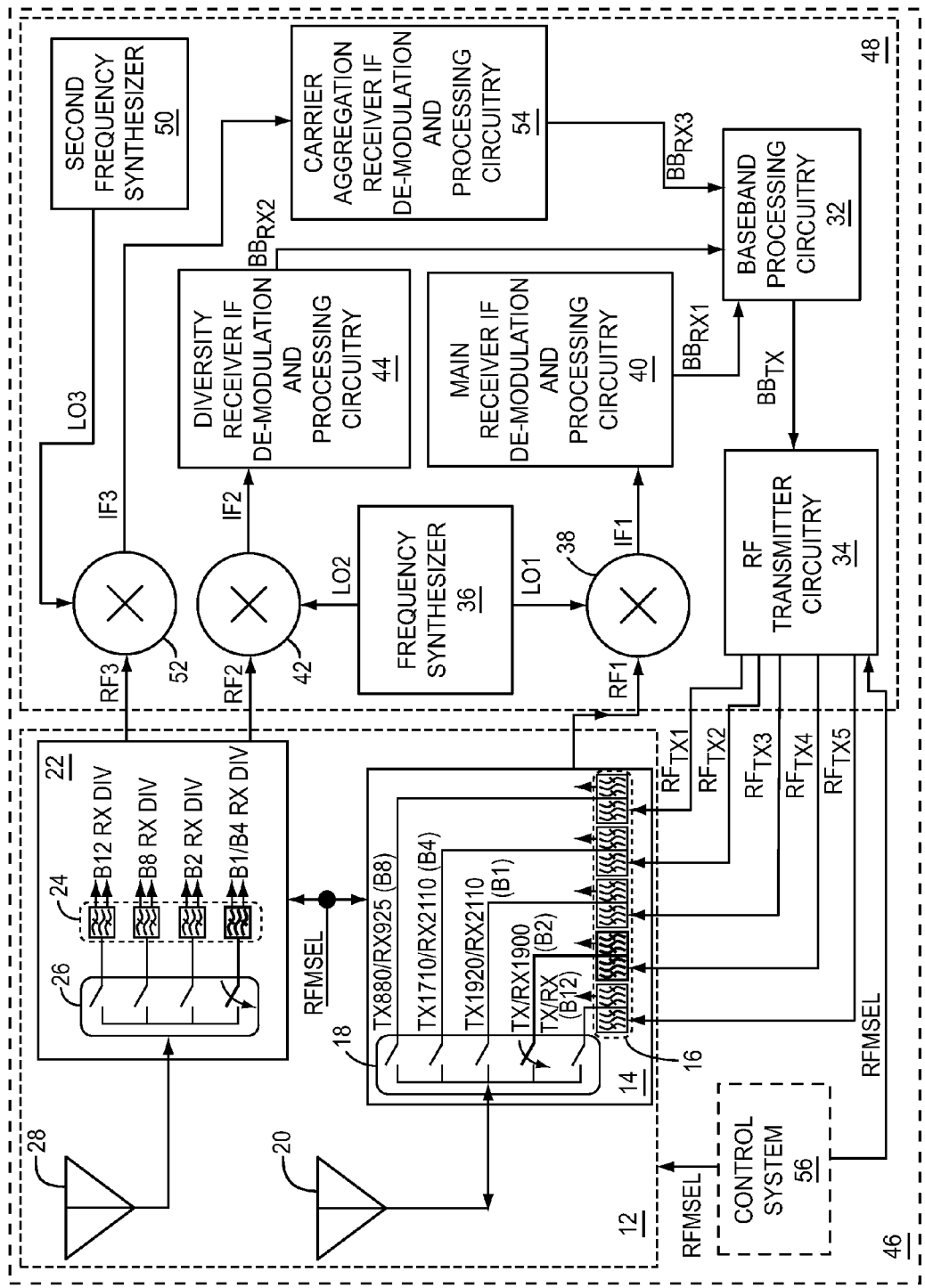
FIG. 5 is a schematic of the carrier aggregation radio system operating in the second mode for carrier aggregation that transmits and receives RF signals within a band B2 while receiving an RF signal in another band B4.

FIG. 5 is a schematic of the carrier aggregation radio system 46 operating in the second mode for carrier aggregation in a third example. In this third case, the band B2 duplexer of the duplexers 16 is active and the band B1/B4 RX filter of the receive only filters 24 is active. In this third example, high band to high band carrier aggregation is achieved by transmitting and receiving RF signals in band B2, while receiving other RF signals in band B4.

Figure 6:
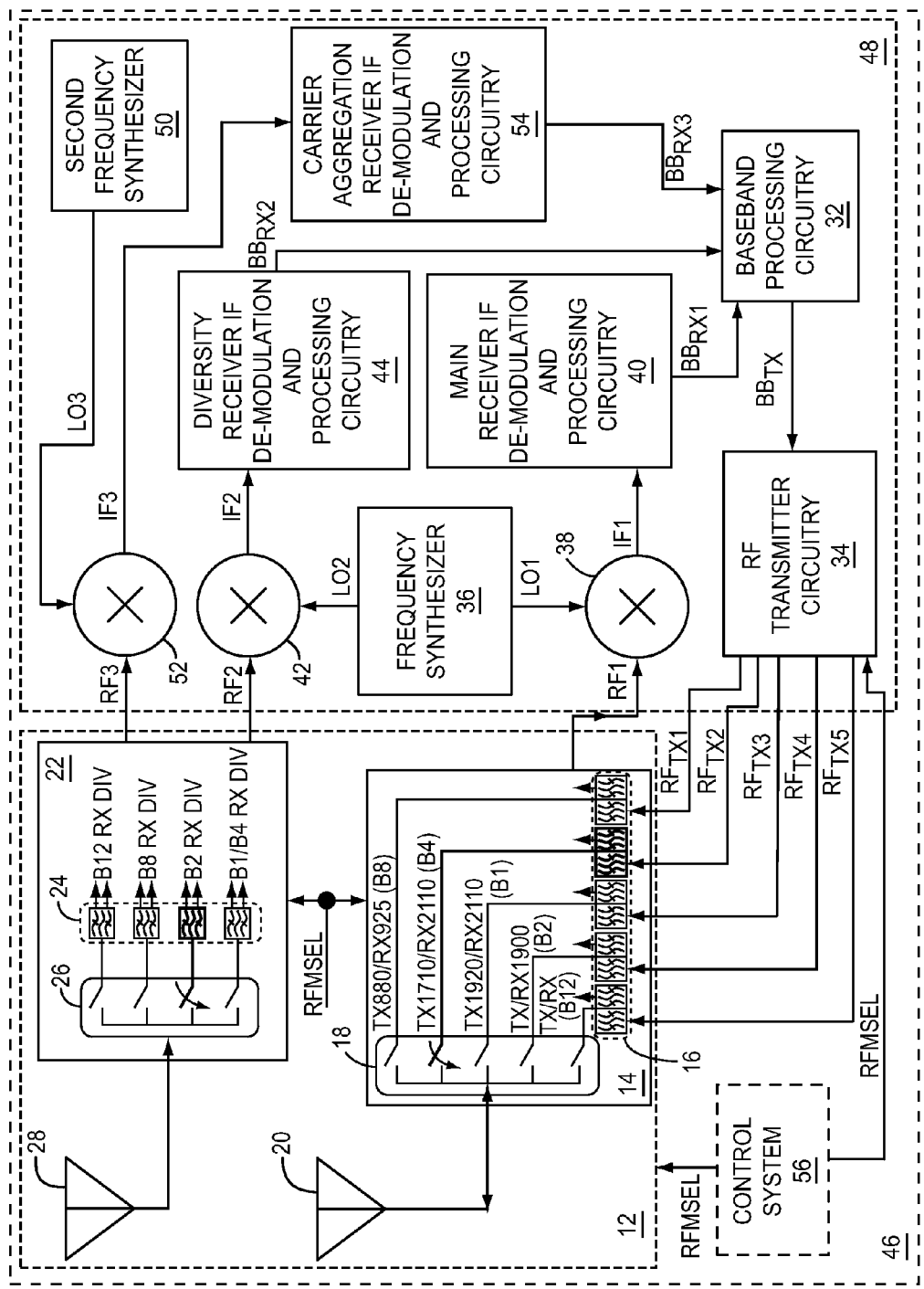
FIG. 6 is a schematic of the carrier aggregation radio system operating in the second mode for carrier aggregation that transmits and receives RF signals within the band B4 while receiving an RF signal in the band B2.

FIG. 6 is a schematic of the carrier aggregation radio system 46 operating in the second mode for carrier aggregation in a fourth example. In this fourth case, the band B4 duplexer of the duplexers 16 is active and the band B2 RX filter of the receive only filters 24 is active. In this fourth example, high band to high band carrier aggregation is achieved by transmitting and receiving RF signals in band B4, while receiving other RF signals in band B2.

Figure 7:
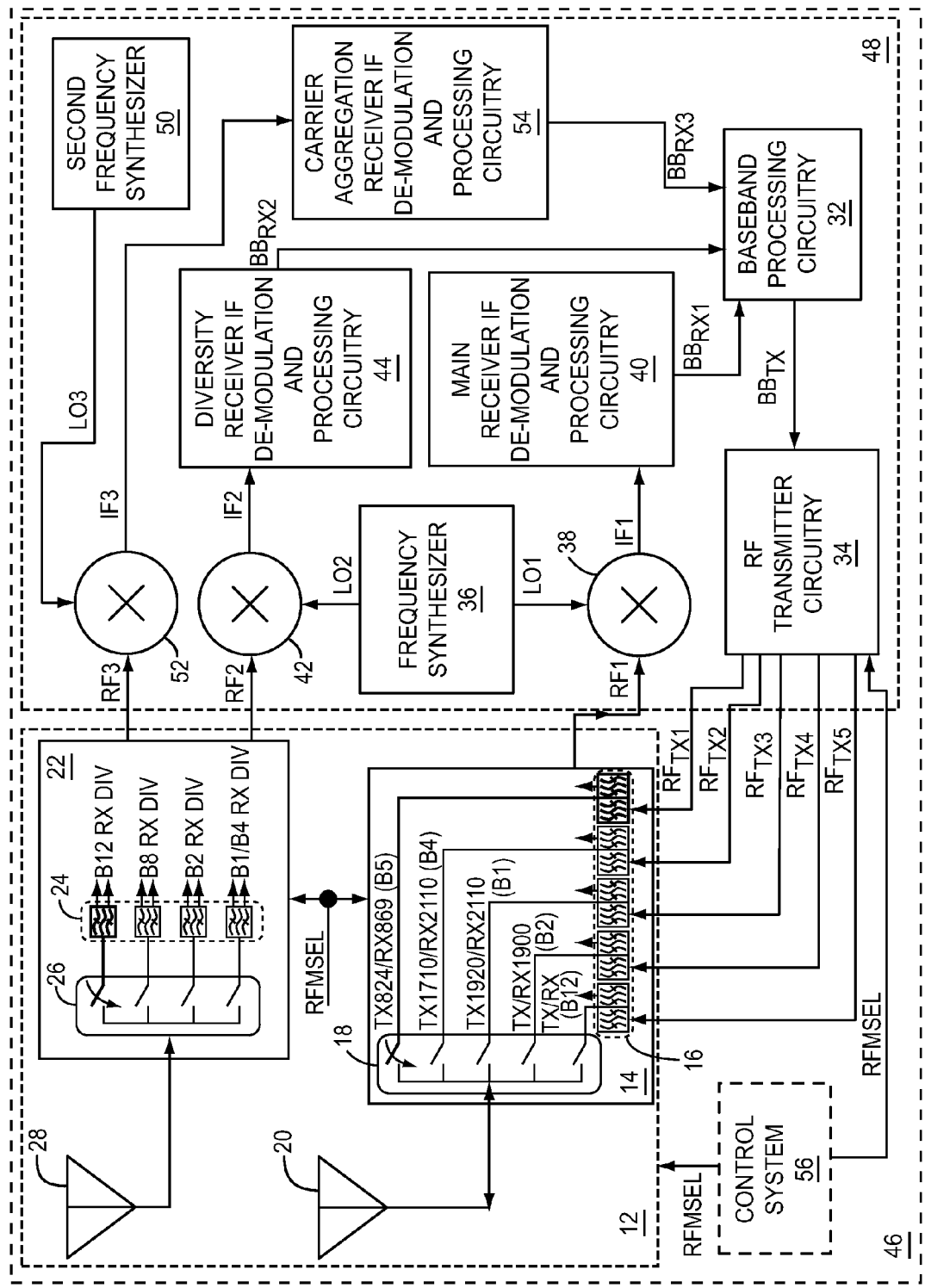
FIG. 7 is a schematic of the carrier aggregation radio system operating in the second mode for carrier aggregation that transmits and receives RF signals within a band B5 while receiving an RF signal in another band B12.

FIG. 7 is a schematic of the carrier aggregation radio system 46 operating in the second mode for carrier aggregation in a fifth example. In this fifth case, the band B5 duplexer of the duplexers 16 is active and the band B12 RX filter of the receive only filters 24 is active. In this fifth example, low band to low band carrier aggregation is achieved by transmitting and receiving RF signals in band B5, while receiving other RF signals in band B12.

In another embodiment of the present disclosure, a third mode is provided that implements carrier aggregation on an extra band while simultaneously allowing diversity reception on another band. For example, the third mode receives the extra band and a first band via the diversity antenna while the main antenna simultaneously transmits and receives on the first band. It is to be understood that the first and second modes are also allowed with this embodiment.

Figure 8:
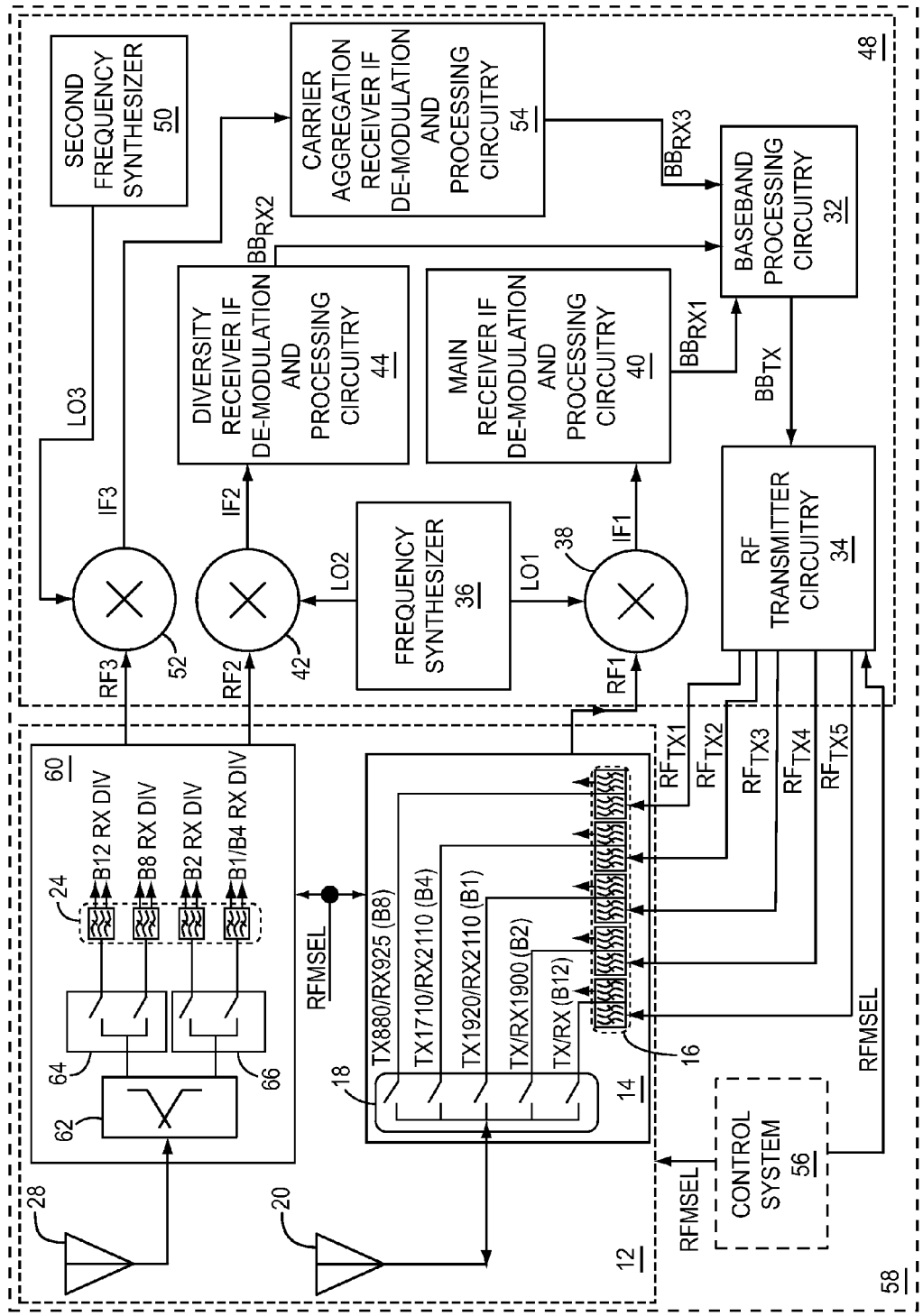
FIG. 8 is a schematic diagram depicting another embodiment of a carrier aggregation radio system that enables the third mode by modifying the diversity receiver front end circuitry.

FIG. 8 is a schematic diagram depicting another embodiment of a modified carrier aggregation radio system 58 that enables the third mode by modifying the diversity receiver front end circuitry 22 (FIGS. 1 through 7). A modified diversity receiver front end circuitry 60 couples the multiplexed port of a low band and high band receiver diplexer network 62 to the diversity antenna 28. The low band and high band receiver diplexer network 62 separates low bands (<1 GHz) from high bands (>1.3 GHz). A low band RF switch 64 has a pole coupled to the low band port of the low band and high band receiver diplexer network 62 and throws coupled to low band filters of the receive only filters 24. Moreover, a high band RF switch 66 has a pole coupled to the high band port of the low band and high band receiver diplexer network 62 and throws coupled to high band filters of the receive only filters 24.

The modified carrier aggregation radio system 58 introduces receive diplexing on the diversity antenna 28 as opposed to receive/transmit diplexing on the main antenna 20. As a result, an extra insertion loss due to the low band and high band receiver diplexer network 62 only affects extra band reception and diversity reception rather than affecting bands received through the main antenna 20.

Figure 9:
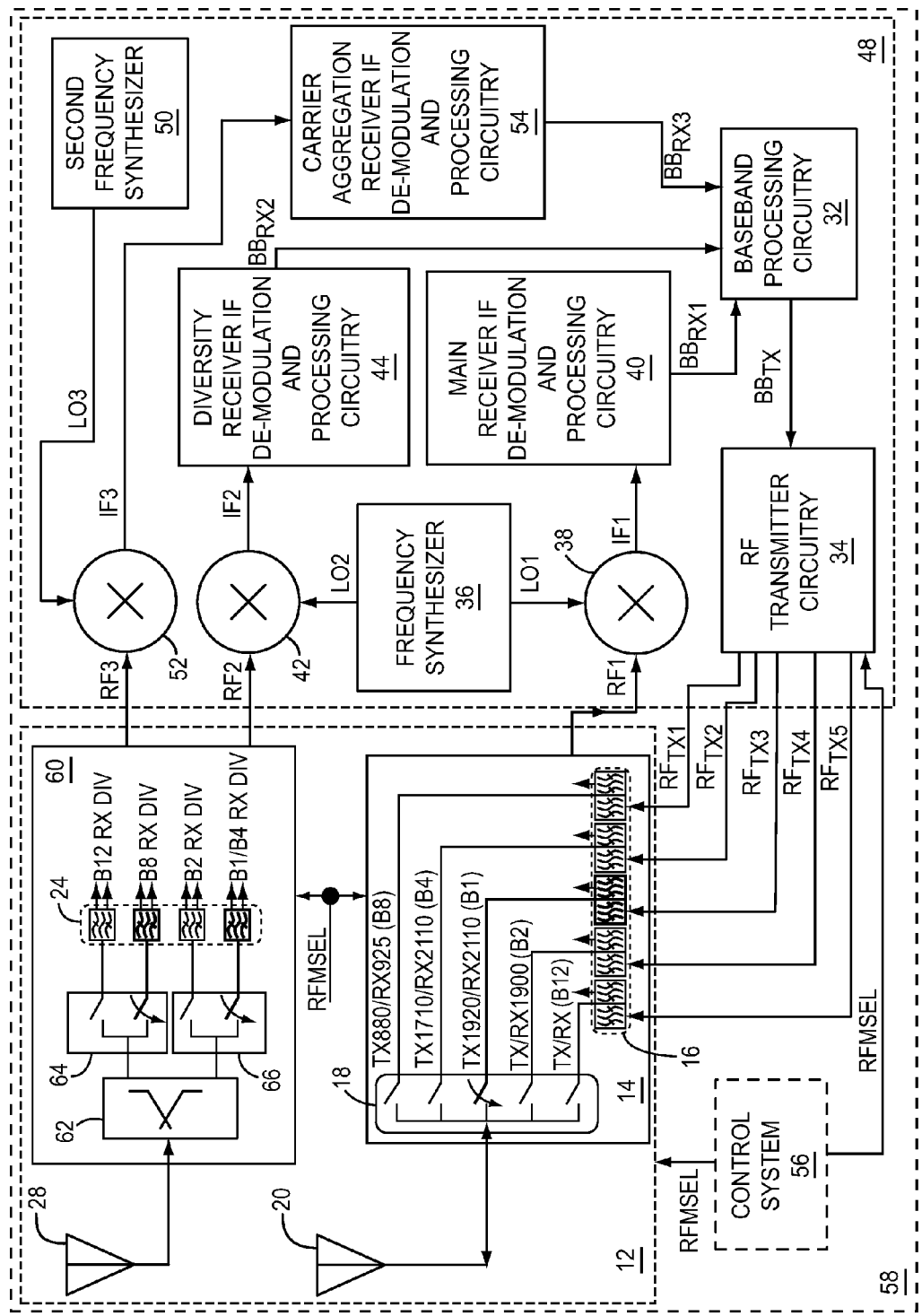
FIG. 9 is a schematic of the carrier aggregation radio system of FIG. 7 operating in the third mode for carrier aggregation that transmits and receives RF signals within the band B1 including band B1 receiver diversity while receiving an RF signal in the band B8.

FIG. 9 is a schematic of the modified carrier aggregation radio system 58 operating in the third mode for carrier aggregation in a first example. In this first case, the band B1 duplexer of the duplexers 16 is active along with the band B8 RX filter and the band B1/B4 filter of the receive only filters 24. In this first example, low band to high band carrier aggregation is achieved by transmitting and receiving RF signals in band B1 via the main antenna 20, while receiving band B1 RF signals and extra RF signals in band B8 via the diversity antenna 28.

Figure 10:
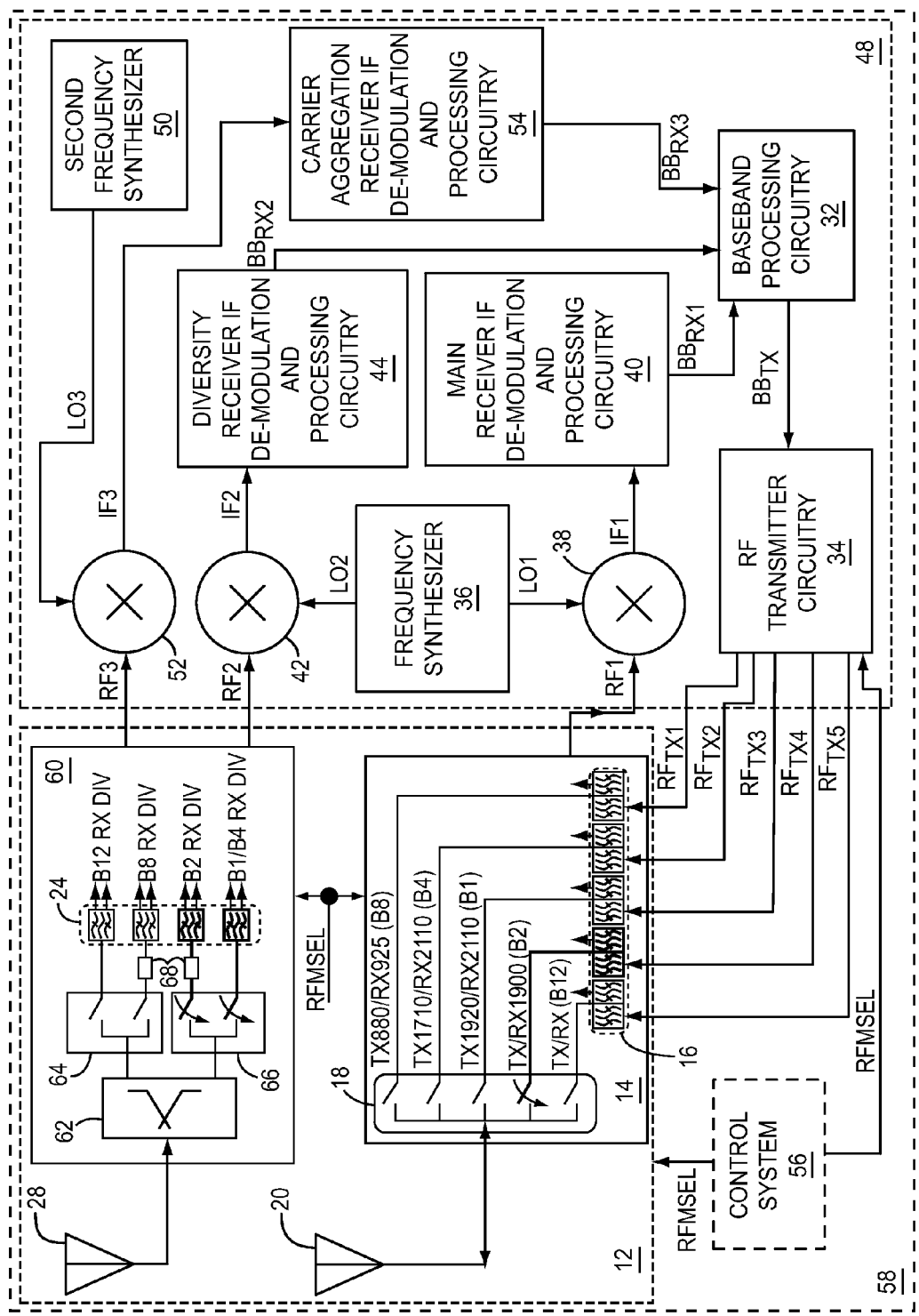
FIG. 10 is a schematic of the carrier aggregation radio system of FIG. 7 operating in the third mode for carrier aggregation that transmits and receives RF signals within the band B2 including band B2 receiver diversity while receiving an RF signal in the band B4.

FIG. 10 is a schematic of the modified carrier aggregation radio system 58 operating in the third mode for carrier aggregation in a second example. In this second case, the band B2 duplexer of the duplexers 16 is active along with the band B2 RX filter and the band B1/B4 filter of the receive only filters 24. In this second example, high-band to high-band carrier aggregation is achieved by transmitting and receiving RF signals in band B2 via the main antenna 20, while receiving band B1 RF signals and extra RF signals in band B4 via the diversity antenna 28. Additional network elements such as phase shifters 68 can be added to improve reflective power matching and receive diplexing.

Figure 11:
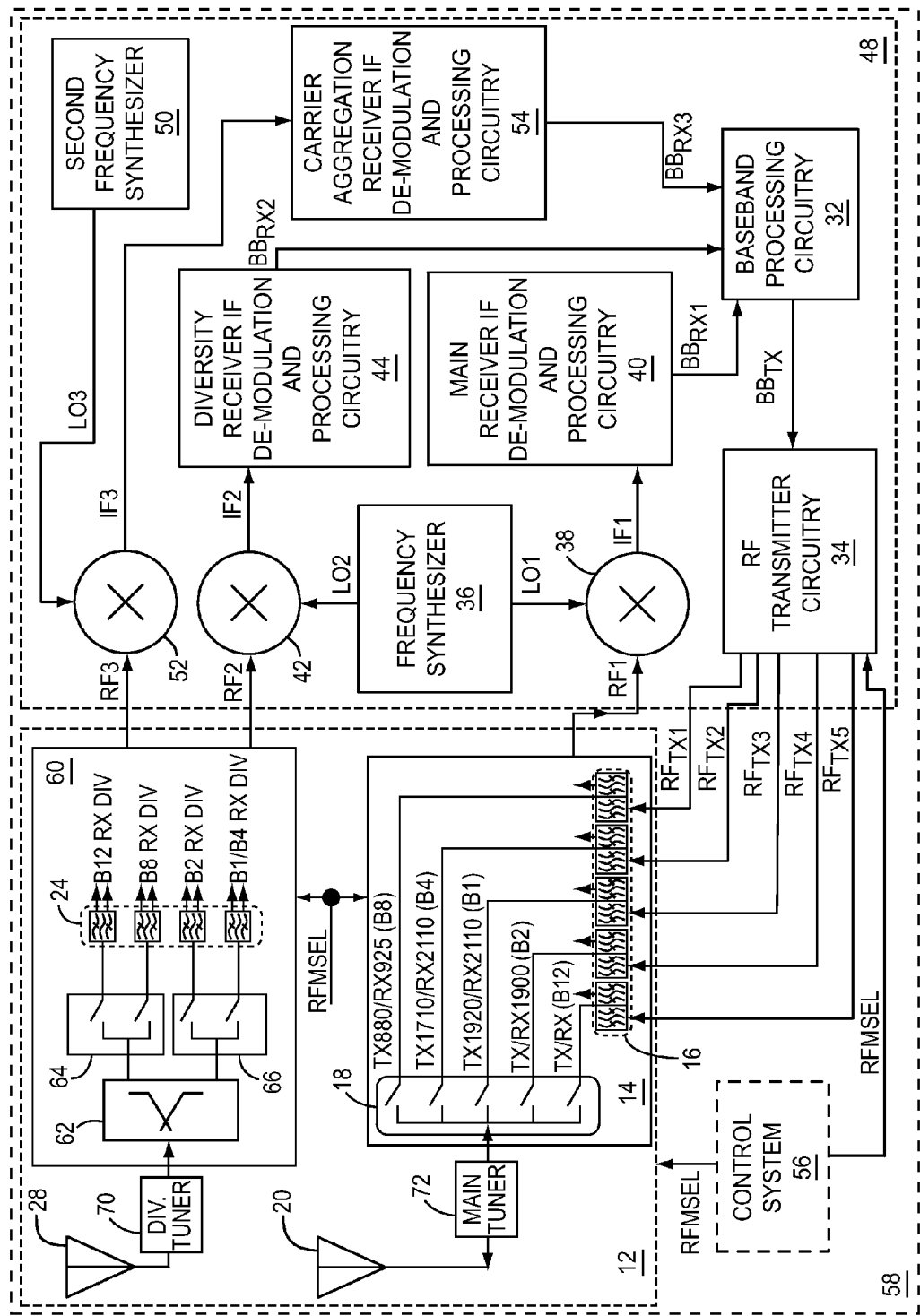
FIG. 11 is a schematic of the carrier aggregation radio system that includes a diversity antenna tuner and a main antenna tuner.

FIG. 11 is a schematic of the modified carrier aggregation radio system 58 that includes a diversity antenna tuner 70 and a main antenna tuner 72. The combination of the diversity antenna tuner 70 and the main antenna tuner 72 is expected to provide around 10 dB of antenna to antenna isolation when operation within a single band is occurring. Moreover, the diversity antenna tuner 70 and the main antenna tuner 72 are usable to maximize antenna radiation efficiency while reducing return loss across various frequency bands of operation.

Figure 12:
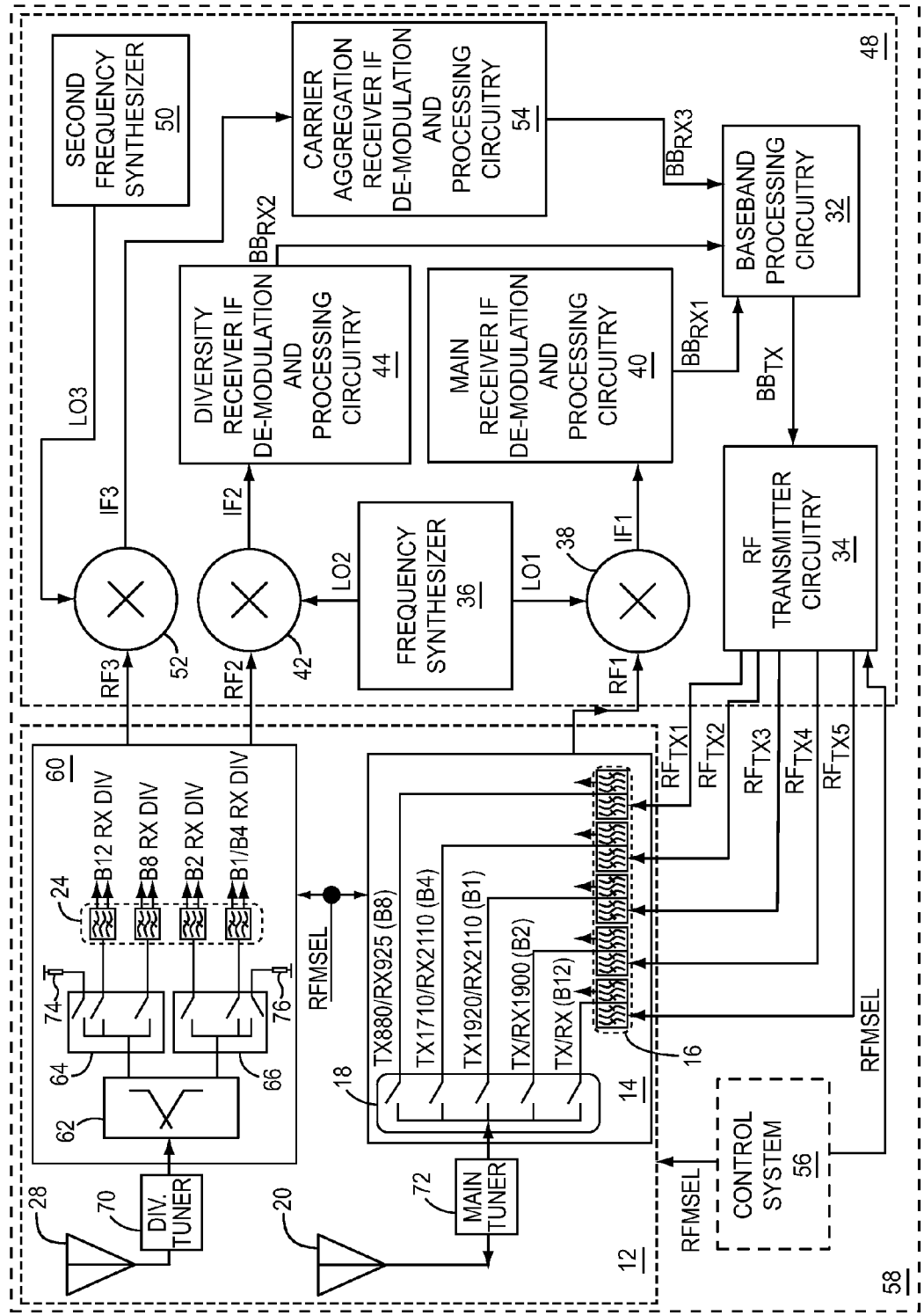
FIG. 12 is a schematic of the carrier aggregation radio system wherein the radio front end includes additional throws terminated by 50 Ohm impedances.

FIG. 12 is a schematic of the modified carrier aggregation radio system 58 that includes a low band termination network 74 coupled between an extra switch throw of the low band RF switch 64 and a termination node such as ground. Also included is a high-band termination network 76 coupled between an extra switch throw of the high band RF switch 66 and the termination node. Preferably, the low band termination network 74 and the high band termination network 76 each provide around 50 Ohms of impedance when a given one of the low band or high band diplexer ports is not in use. Moreover, the low band termination network 74 and the high band termination network 76 can be used in unison to terminate the diversity antenna 28 at times when the diversity antenna 28 is not in use.

Figure 13:
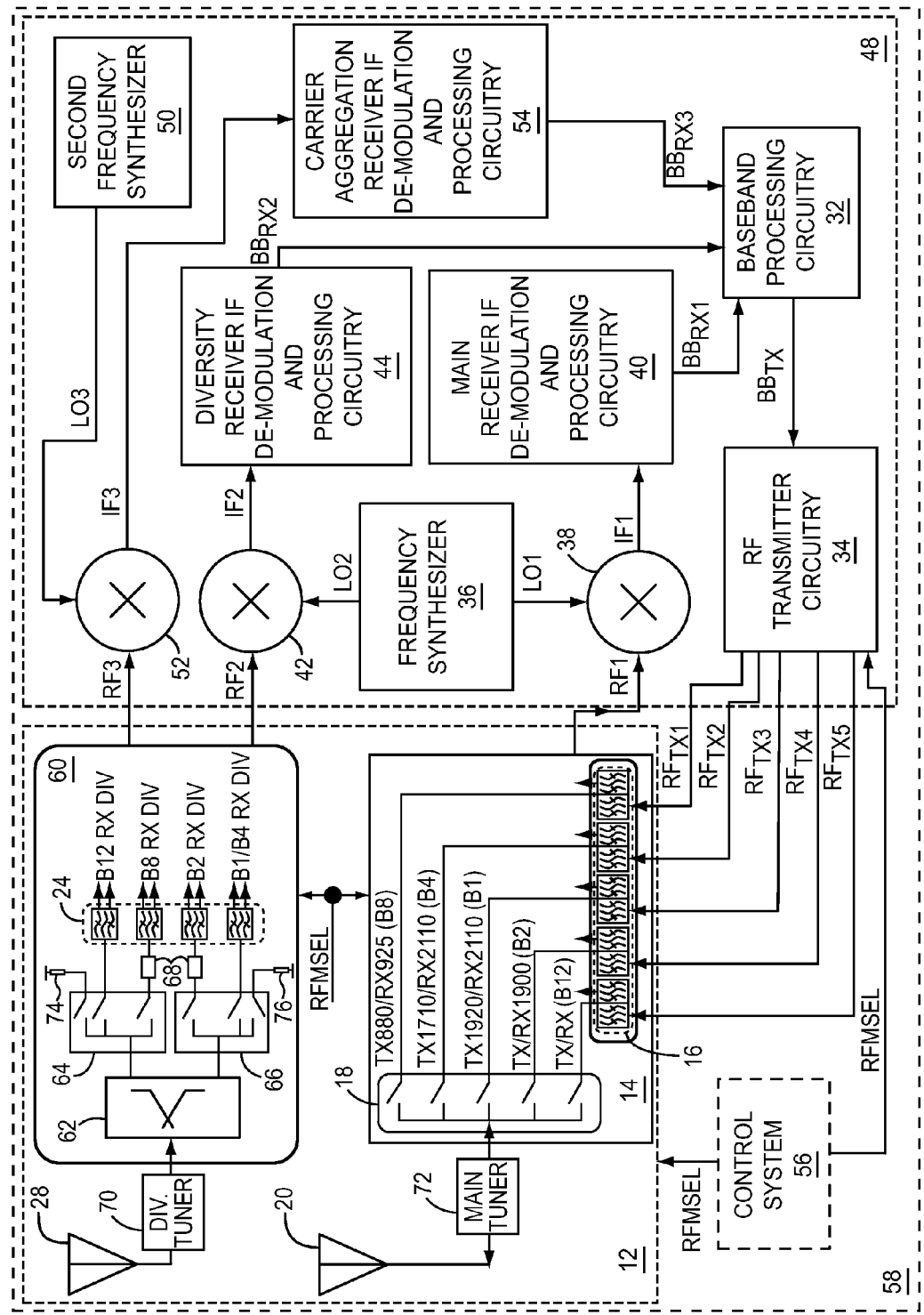
FIG. 13 is a schematic of the carrier aggregation radio system wherein a modified diversity receiver front end circuitry is integrated into a switch diplexer module (SDM).

FIG. 13 is a schematic of the modified carrier aggregation radio system 58 wherein the modified diversity receiver front end circuitry 60 is integrated into a switch diplexer module (SDM). Moreover, it is preferred that the duplexers 16 also be integrated into a duplexer module. The modular nature of both the modified diversity receiver front end circuitry 60 and the duplexers 16 is denoted by the relatively solid thick rounded boxes that encompass each, respectively. The integration of the modified diversity receiver front end circuitry 60 allows for relatively tight control of the diplexing of various bands. This relatively tight control of the diplexing would be comparatively difficult if the modified diversity receiver front end circuitry 60 was fabricated on a typical printed circuit board (PCB). Another advantage of integrating the modified diversity receiver front end circuitry 60 into an SDM is that for each new band combination for carrier aggregation, only the SDM needs to be redesigned compared to a complete radio front end redesign that would ordinarily be needed.

Those skilled in the art will recognize improvements and modifications to the preferred embodiments of the present disclosure. All such improvements and modifications are considered within the scope of the concepts disclosed herein and the claims that follow.

What is claimed is:
1. A carrier aggregation radio system comprising:
  a transceiver comprising;
    main receiver intermediate frequency (IF) de-modulation and processing circuitry coupled to a first RF mixer that receives a first local oscillator signal to mix with RF signals captured by a main antenna;
    diversity receiver IF de-modulation and processing circuitry coupled to a second RF mixer that receives a second local oscillator signal to mix with diversity signals captured by a diversity antenna;

carrier aggregation receiver IF de-modulation and processing circuitry coupled to a third RF mixer that receives a third local oscillator signal to mix with carrier aggregation signals captured by the diversity antenna; and a control system configured to:

command a radio front end to route diversity signals from the diversity antenna to the main receiver IF de-modulation and processing circuitry and the diversity receiver IF de-modulation and processing circuitry in a first mode;

command the radio front end to route carrier aggregation signals from the diversity antenna to the carrier aggregation receiver IF de-modulation and processing circuitry in a second mode; and command the radio front end via a third mode in which diversity signals are routed from the diversity antenna to the main receiver IF de-modulation and processing circuitry and the diversity receiver IF de-modulation and processing circuitry while carrier aggregation signals are routed from the diversity antenna to the carrier aggregation receiver IF de-modulation and processing circuitry.

2. The carrier aggregation radio system of claim 1 wherein the second mode provides low band to high band carrier aggregation.

3. The carrier aggregation radio system of claim 1 wherein the second mode provides high band to high band carrier aggregation.

4. The carrier aggregation radio system of claim 1 wherein the second mode provides low band to low band carrier aggregation.

5. The carrier aggregation radio system of claim 1 wherein the radio front end comprises:

main receiver front end circuitry that includes duplexers and main antenna switches that are communicatively coupled between a main antenna and the duplexers; and diversity receiver front end circuitry that includes receive only filters and diversity antenna switches that are communicatively coupled between the diversity antenna and the receive only filters.

6. The carrier aggregation radio system of claim 5 further including a diplexer coupled between the diversity antenna and the diversity antenna switches to separate high band signals from low band signals captured by the diversity antenna.

7. The carrier aggregation radio system of claim 6 further including at least one network element coupled between the diversity antenna switches and the receive only filters to improve reflective power matching and receive diplexing.

8. The carrier aggregation radio system of claim 7 wherein the at least one network element is a phase shifter.

9. The carrier aggregation radio system of claim 6 further including at least one termination network coupled between an extra switch throw of the diversity antenna switches and a termination node.

10. The carrier aggregation radio system of claim 9 wherein the at least one termination network provides around 50 Ohms of impedance when a given one of either a low band port or a high band diplexer port is not in use.

11. The carrier aggregation radio system of claim 6 further including an antenna tuner network coupled between the main antenna and the main antenna switches.

12. The carrier aggregation radio system of claim 6 further including an antenna tuner network coupled between the diversity antenna and the diversity antenna switches.

13. The carrier aggregation radio system of claim 6 wherein the diversity receiver front end circuitry is integrated into a switch duplexer module (SDM).

14. The carrier aggregation radio system of claim 6 wherein the duplexers are integrated into a duplexers module.

15. A method of wireless communication including carrier aggregation comprising:

capturing diversity signals and carrier aggregation signals via a main antenna and a diversity antenna;

routing the diversity signals to a first mixer coupled to main receiver IF de-modulation and processing circuitry and to a second mixer coupled to diversity receiver IF de-modulation and processing circuitry in a first mode;

mixing the diversity signals with a first local oscillator signal to output a first IF signal to the main receiver IF de-modulation and processing circuitry via the first mixer;

mixing the diversity signals with a second local oscillator signal to output a second IF signal to the diversity receiver IF de-modulation and processing circuitry via the second mixer;

routing the carrier aggregation signals to a third mixer coupled to carrier aggregation receiver IF de-modulation and processing circuitry in a second mode;

mixing the carrier aggregation signals with a third local oscillator signal to output a third IF signal to the carrier aggregation receiver IF de-modulation and processing circuitry via the third mixer, and routing diversity signals from the diversity antenna to the main receiver IF de-modulation and processing circuitry and the diversity receiver IF de-modulation and processing circuitry while routing carrier aggregation signals from the diversity antenna to the carrier aggregation receiver IF de-modulation and processing circuitry in a third mode.

16. The method of wireless communication of claim 15 wherein the second mode provides low band to high band carrier aggregation.

17. The method of wireless communication of claim 15 wherein the second mode provides high band to high band carrier aggregation.

18. The method of wireless communication of claim 15 wherein the second mode provides low band to low band carrier aggregation.

* * * * *